July 20, 1965   C. A. WILEY   3,196,436
PULSED DOPPLER RADAR METHODS AND APPARATUS
Filed Aug. 13, 1954   7 Sheets-Sheet 1

INVENTOR.
Carl A. Wiley
BY
*A.H. Oldham*
ATTORNEY

July 20, 1965   C. A. WILEY   3,196,436
PULSED DOPPLER RADAR METHODS AND APPARATUS
Filed Aug. 13, 1954   7 Sheets-Sheet 2

INVENTOR.
Carl A. Wiley
BY
H. H. Oldham
ATTORNEY

July 20, 1965          C. A. WILEY          3,196,436
PULSED DOPPLER RADAR METHODS AND APPARATUS
Filed Aug. 13, 1954          7 Sheets-Sheet 5
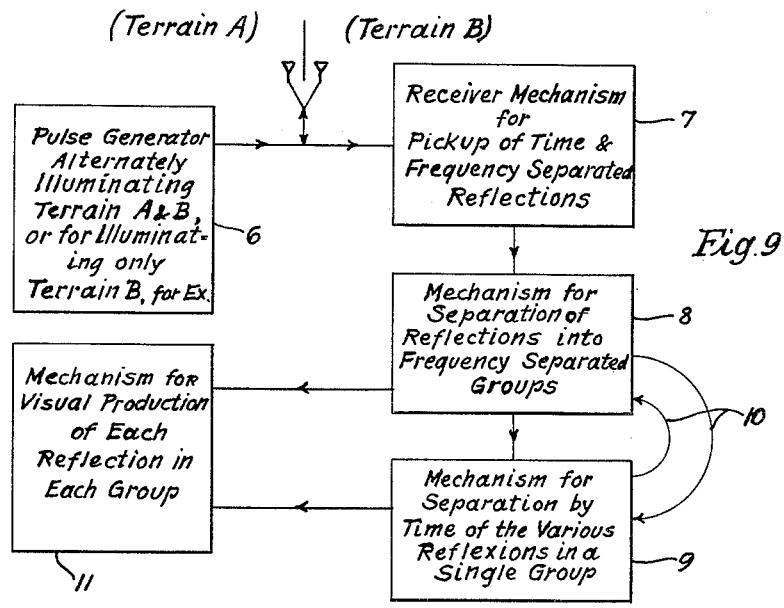
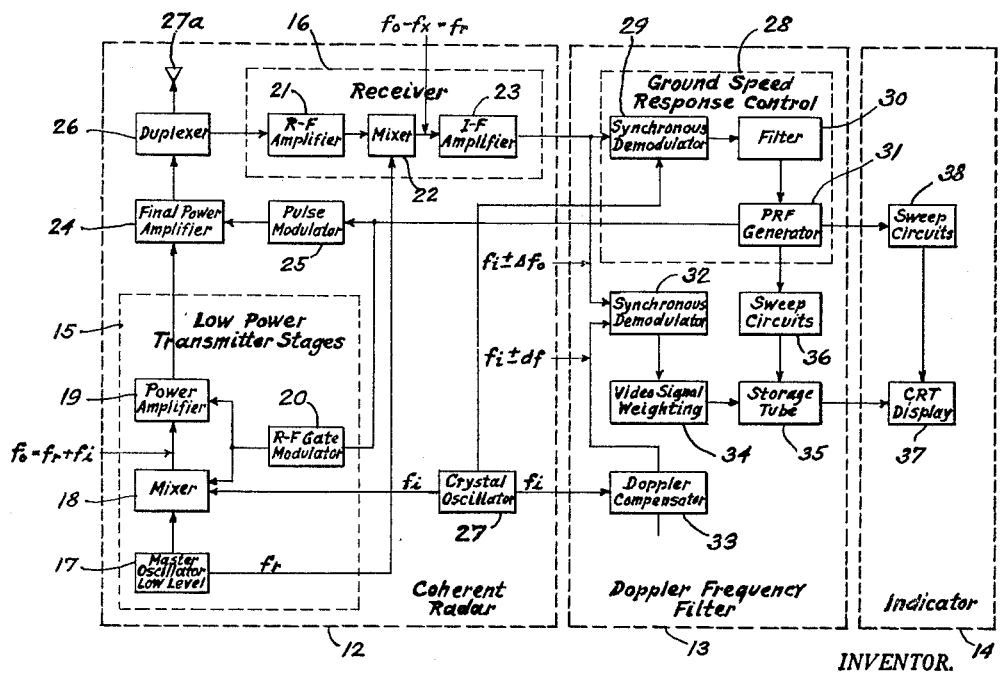
Fig. 10
INVENTOR.
Carl A. Wiley
BY
A. H. Oldham
ATTORNEY July 20, 1965            C. A. WILEY            3,196,436

PULSED DOPPLER RADAR METHODS AND APPARATUS

Filed Aug. 13, 1954            7 Sheets-Sheet 6

INVENTOR.
Carl A. Wiley
BY
ATTORNEY

United States Patent Office 3,196,436
Patented July 20, 1965

3,196,436
PULSED DOPPLER RADAR METHODS
AND APPARATUS
Carl A. Wiley, Phoenix, Ariz., assignor to Goodyear Aerospace Corporation, a corporation of Delaware
Filed Aug. 13, 1954, Ser. No. 449,559
14 Claims. (Cl. 343—17)

This invention relates to pulsed radar methods and apparatus, and, more particularly, to terrain mapping radars borne by moving objects, for example, an airplane, and making use of the Doppler frequency shift phenomenon to obtain angular resolutions, and/or scanning in azimuth.

Conventional radars using a directional scanning antenna are open to various objections when employed on a moving body, such as an airplane, and particularly is this true when the object is moved at high speed, such as supersonic speeds now developed by high flying rockets and guided missiles. In these cases obtaining radar information from conventional equipment at high enough rates becomes increasingly complex. Conventional sweep beam radars having moving antennas usually require the antennas to be housed in large radomes which must be designed to withstand high temperatures and air loads and which by beam refraction can throw errors into results obtained. Another difficulty of conventional radars is the necessary stabilization of the antenna.

It is the general object of the invention to avoid and overcome the foregoing and other difficulties of and objections to known radar equipment by the provision of an improved radar system which obtains angular resolution, i.e., scanning in azimuth, by means of Doppler shift, which uses a simplified antenna construction, and which has a high information rate.

Another object of the invention is to provide a pulsed Doppler type radar having in one form of the invention an unbeamed antenna, and with reflections from the terrain being separated into groups differing from each other by frequency changes due to the Doppler effect, the reflections in each group being time-separated, and the several groups and the time-separated reflections in each group being visually reproduced.

Another object of the invention is the provision of radar systems of the type described but utilizing a beamed antenna, the beam of the antenna being stationary relative to the aircraft and directed laterally thereof.

Another object of the invention is to provide a pulsed but unbeamed radar adapted to be carried by an aircraft and alternately illuminating right and left hand portions of the terrain, or only illuminating one side or hand of the terrain, the display of the radar being a sequence of sectors radiating from the position of the aircraft each sector corresponding to that part of the terrain causing a given frequency shift in the return, and with the return in any sector being time-separated.

Another object of the invention is to provide an airborne radar system in which azimuth scanning is effected by a progressively changing passband filter responsive to the different Doppler effects of the terrain illuminated, and range is determined by the position of the return in time.

Another object of the invention is the provision of methods and apparatus of the character described in which reflections of time and frequency-separated character are stored temporarily but are periodically read off on display or indicating means.

Another object of the invention is to provide in combination a pulsed coherent radar, a filter for separating from all others those targets which have a given Doppler shift, and an indicator, and in which scanning is accomplished by shifting the passband of the filter for a line-at-a-time picture buildup, or by placing a number of the filters in parallel so that all of the azimuth lines are built up simultaneously to produce an entire radar picture at once.

Another object of the invention is the provision of radar in which all velocity classes of scatters may be separated simultaneously rather than in sequence resulting in the formation of radar images in much less time than is possible with conventional scanning beam radars.

Another object of the invention is the discrimination in velocity among the Doppler shifted returns from many moving radar targets by means of comb filtering.

Another object of the invention is the provision, in conjunction with apparatus of the type described in the preceding paragraph, of mechanism for weighting the signal input to the filter (the synchronous demodulator) to emphasize the echo signal of the reflecting scatterer having an azimuth corresponding to the passband, this emphasis being achieved by increasing the rejection ratio of the stop bands of the filter.

Another object of the invention is to provide automatic means for coordinating the pulse repetition frequency (or the frequency) of the airborne coherent radar with respect to ground speed so that the Doppler spectrum around any harmonic of the pulse repetition frequency (hereinafter called PRF) be just wide enough to meet but not overlap the spectrum around the adjacent harmonics in order that the entire spectrum is substantially filled with unambiguous target return information.

Another object of the invention is to provide mechanism for periodically and progressively changing the frequency of the coherent reference signal so that a single filter may be used for building up any chosen Doppler shift.

The foregoing objects of the invention, and other objects which will become apparent as the description proceeds, are achieved by the provision of that method of scanning terrain from a moving object, such as an aircraft, which includes the steps of sending out, usually isotropically, a series of time-separated pulses from the object, listening between pulses for the reflections of the pulse from the terrain, separating the reflections into groups differing from each other by frequency changes due to the Doppler effect, maintaining the time-separated reflections in each group, and visually reproducing the several groups and the time-separated reflections in each group. In the practice of the invention right hand and left hand portions of the terrain may be alternately illuminated by the pulse, or a series of pulses, or only one side or hand is illuminated. Thus, by means of frequency separation the terrain is resolved with respect to azimuth and time separation gives resolution with respect to range. The information, thus separated, is then usually displayed on a cathode ray tube.

The invention likewise automatically coordinates the

PRF of the coherent radar with the ground speed of the aircraft bearing the radar so that the spectrum around any harmonic of the PRF be just wide enough to meet but not overlap the spectrum around the adjacent harmonics in order to fill the entire return spectrum with unambiguous scatterer return information.

Mechanism is also preferably incorporated in the system for weighting the video output signals of the synchronous demodulator to emphasize the echo signal of a scatterer having an azimuth corresponding to the passband.

For a better understanding of the invention reference should be had to the accompanying drawings wherein FIG. 1 is a diagrammatic illustration in perspective form of an aircraft incorporating the apparatus of the invention and transmitting an unbeamed, i.e., isotropic pulse, the figure illustrating one typical conical section created by the pulse and showing the intersection of this cone with the terrain;

FIG. 9 is a schematic box diagram of a typical mechanism assembly of the invention;

FIG. 10 is a view similar to FIG. 9 but in somewhat greater detail;

Figure 12:
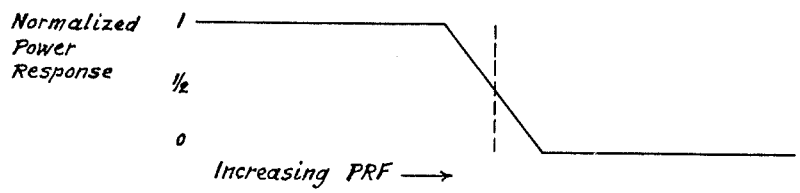
Figure 13:
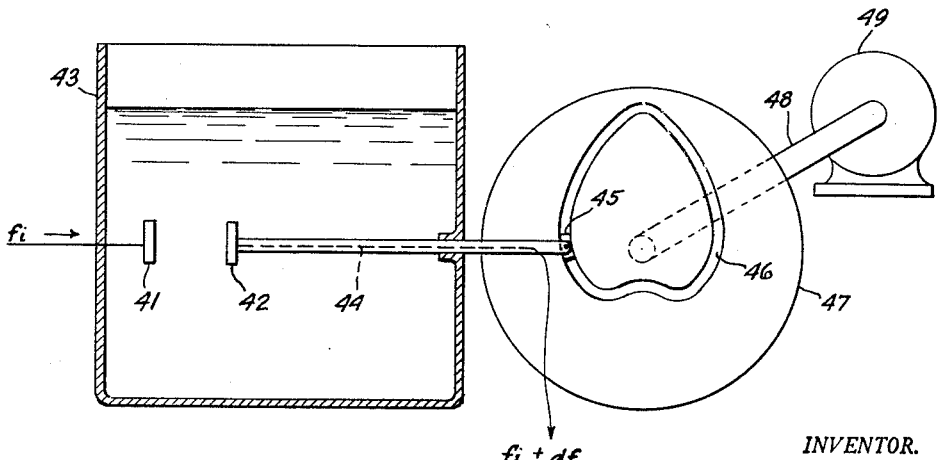
Figure 14:
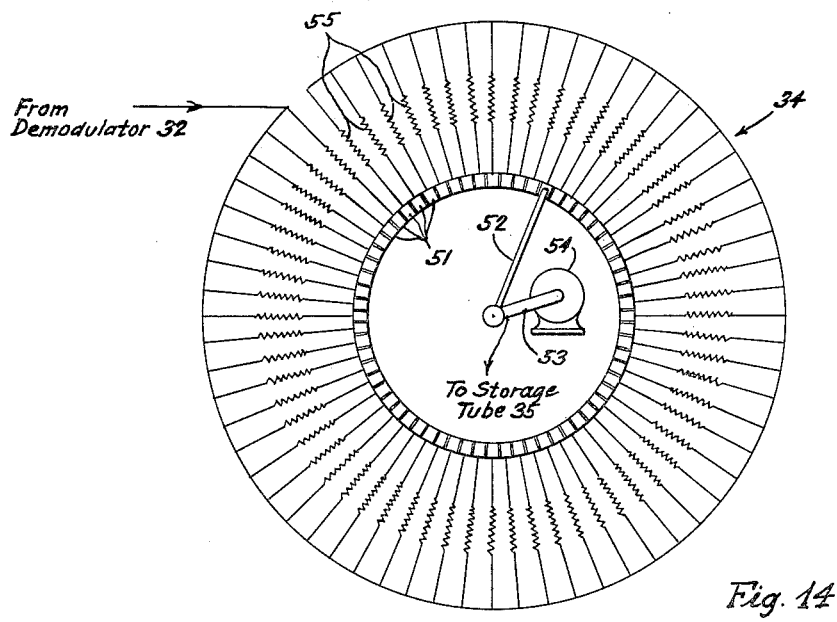
Figure 15:
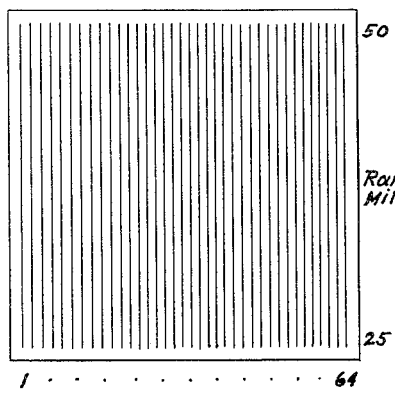
Figure 16:
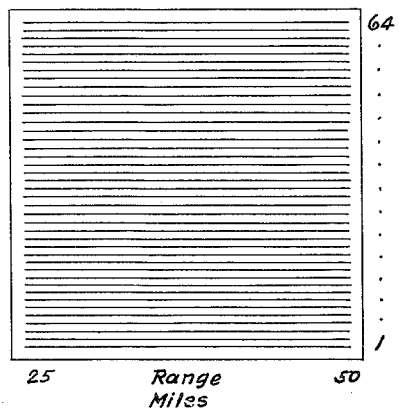

FIG. 12 graphically illustrates the power response from one-half harmonic positions as a function of the PRF;

FIG. 13 is a more detailed illustration of the Phase Shifter of FIG. 10;

FIG. 14 is a more complete illustration of the Video Signal Weighting of FIG. 10; and FIGS. 15 and 16 are diagrammatic views illustrating the manner of storing line by line information in the storage tube.

Figure 1:
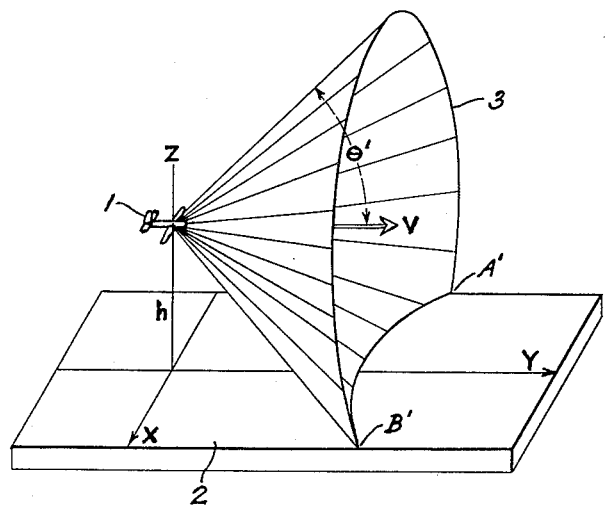

Having reference to FIG. 1 of the drawings, the numeral 1 indicates an airplane at a distance $h$ on a Z axis above terrain 2 lying in the XY plane, the airplane moving in the direction of and with a velocity V. The airplane 1 carries a pulsed coherent radar, each pulse being radiated by way of a fixed antenna with a limited aperture. Each pulse generates (as a geometrical fiction) a cone 3 having as its axis the vector V and with one-half of the apex angle of the cone being equal to $\theta'$. All scatterers intersected by the shell of the cone 3 have a relative motion toward the airplane 1 of $V \cos \theta'$. Thus, all scatterers lying in the surface of the cone 3 have the same Droppler shift. The intersection of the cone 3 with the terrain 2 is a hyperbola A'B', and this hyperbola is the locus of all points on the terrain of equal Doppler shift. (The Doppler shift phenomenon or principle is that if an observer and a vibrating body (as a source of sound, light, or radio waves) are approaching each other or receding from each other, the vibrations, i.e., frequency, will appear closer together or farther apart than they actually are. An approaching sound is sharpened and a receding sound is flattened—Funk and Wagnell's New Standard Dictionary.)

Figure 2:
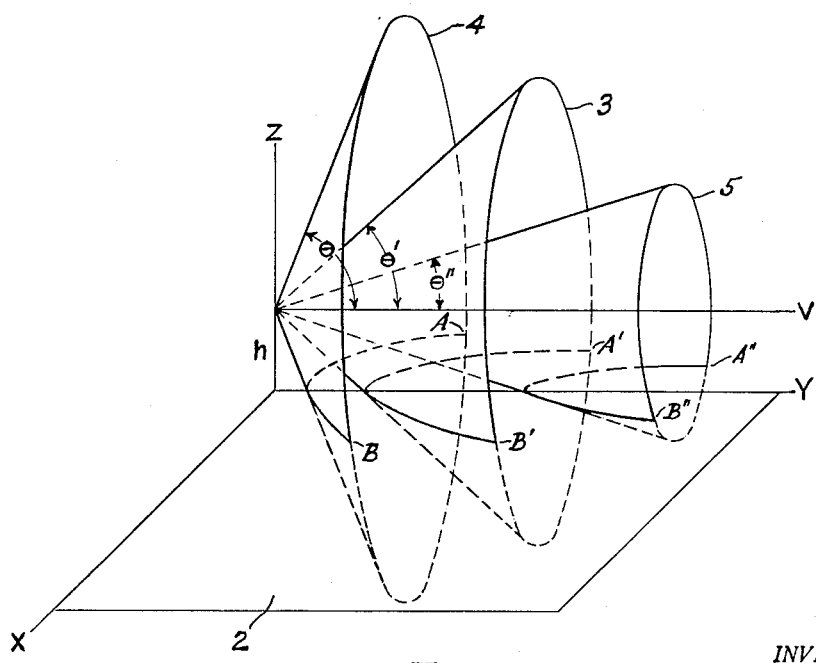
FIG. 2 is a view similar to FIG. 1 but illustrating three typical cones generated by the transmitted pulse and their points of intersection with the terrain.

Actually, the pulse generated by the radar carried by the airplane 1 travels outwardly from the airplane as a continuously increasing spherical shell, or a portion thereof, but for purposes of illustration and in order to determine the different Doppler shift characteristics of different scatterers, it is proper, as discussed in the preceding paragraph, to consider the generated pulse as creating progressively during a plurality of periods of time a series of cones, only three of these cones 4, 3 and 5 being illustrated in FIG. 2 for purposes of simplification. Somewhat more accurately, it can be said that actually only a single cone is generated having its base perimeter carried in the surface of the sphere generated by the pulse and with the cone progressively changing size, as seen in FIG. 2, so as to progressively create, in relation to the terrain, a plurality of hyperbolas AB, A'B', and A"B" constituting lines of intersection of the signal pulse with the terrain 2. It will be recognized that the hyperbolas constituting the lines of intersection of the signal pulse with the terrain are formed progressively as the spherically curved wave front of the signal pulse sweeps across the terrain, i.e., each hyperbola is progressively generated from its base to its outer ends.

Figure 3:
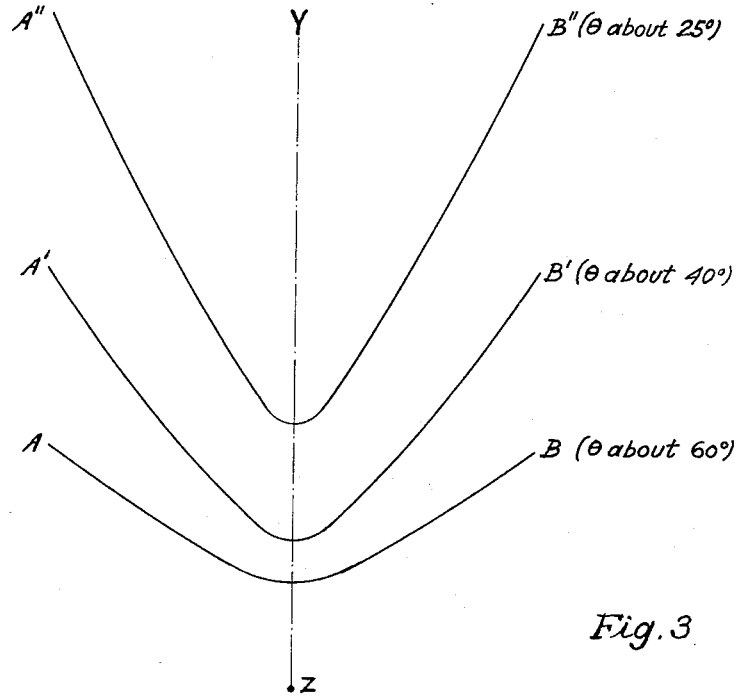
FIG. 3 is a plan view of the lines of intersection of the cones of FIG. 2 with the terrain.

FIG. 3 shows in plan the hyperbolas AB, A'B', and A"B", it being understood from the foregoing discussion that all scatterers lying on the same hyperbola have the same Doppler shift, but that each hyperbola has a different Doppler shift, this shift being greater as angle $\theta$ grows smaller, for example, as it changes from $\theta$ to $\theta'$ to $\theta''$. For purposes of illustration and example only, three of the many hyperbolas actually generated have been shown, namely hyperbola AB generated with $\theta$ about 60°, hyperbola A'B' with $\theta'$ about 40°, and hyperbola A"B" with $\theta''$ about 25°.

Stated in the simplest and most general terms, the scatterers lying at right angles to the line of flight V of the airplane 1 have zero Doppler shift while those lying straight ahead of the airplane and at maximum range have maximum Doppler shift and other scatterers lying somewhere between have some in between Doppler shift.

Figure 4:
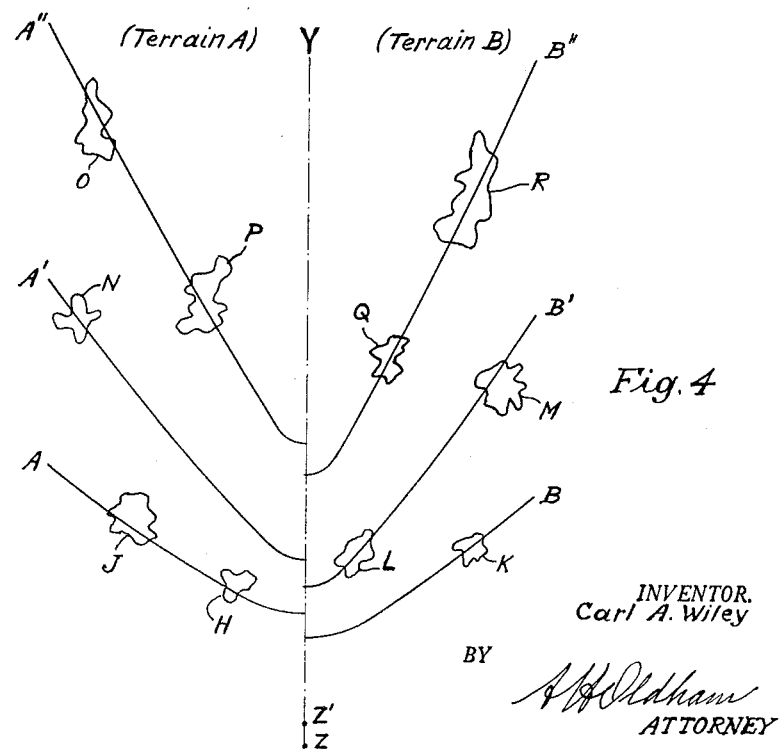
FIG. 4 is a view similar to FIG. 3 but illustrating alternate illumination of right and left hand areas of the terrain.

FIG. 4 illustrated the hyperbolas of FIG. 3, but with terrain A lying to the left of the YZ plane being illuminated alternately with respect to terrain B lying to the right of the YZ plane. In other words, a pulse (or series of pulses) generated on line Z at height $h$ are only allowed to illumine terrain B, and half hyperbolas B, B' and B" are created, and, by way of example, with scatterer K lying on hyperbola B, scatterers L and M lying on hyperbola B', and scatterers Q and R lying on hyperbola B".

The reason for illuminating right and left hand areas of the terrain alternately is, of course, that if a complete hyperbola, like AB is illuminated there is no relatively simple way of telling whether a scatterer lies on the left or right hand side of the hyperbola. It is simpler to iluluminate right and left hand terrain alternately as described, or preferably, to illumine only one hand or side of the terrain as hereinafter discussed.

The illumination of terrain A of FIG. 4 has been diagrammatically shown as being by means of a pulse (or a series of pulses) generated on line Z' (the airplane having moved forwardly) at height $h$ to create half hyperbola A, A', and A", and by way of example, with scatterers H and J lying on hyperbola A, scatterer N lying on hyperbola A', and with scatterers O and P lying on hyperbola A".

Figure 5:
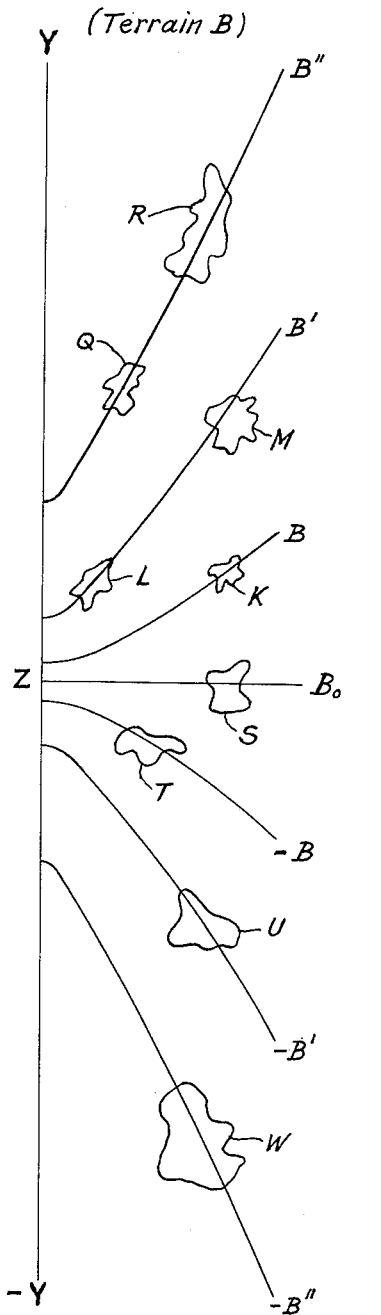
FIG. 5 is a view similar to FIG. 4 and showing only one side or hand of the terrain illuminated but providing scatterers of positive, negative and zero Doppler shift.

FIG. 5 illustrates a typical manner of illuminating only one side or hand of the terrain, but both front and rear. A pulse (or series of pulses) generated at line Z from height $h$ create half hyperbola B having scatterer K thereon, half hyperbola B' having scatterers L and M thereon, and half hyperbola B" having scatterers Q and R thereon. The pulse (or pulses) also create half hyperbola −B having scatterer T, half hyperbola −B' having scatterer U thereon, and half hyperbola −B" having scatterer W thereon. Lying at right angles to the direction V or —YY of the airplane is a scatterer S, it being understood that a reflection or return signal from scatterer S has zero Doppler shift, because S is at right angles to the line of flight V of the airplane.

Figure 6:
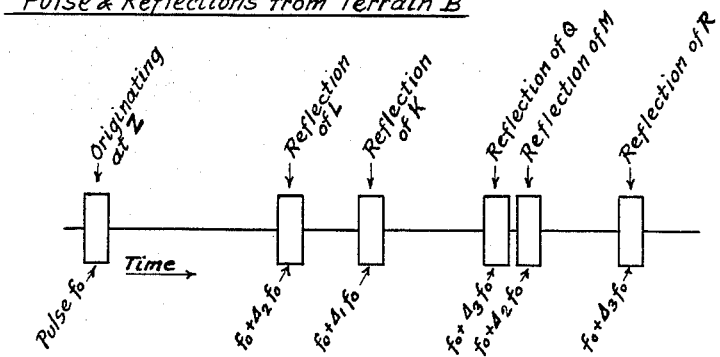
FIG. 6 is a diagrammatic view illustrating the radar pulse and reflections from terrain B plotted against time.

Looking now at FIG. 6, there is shown the modulation envelopes of the pulse and reflections from terrain B. A pulse of short duration, such as two micro-seconds, and at a frequency $f_0$ originates at height $h$ on line Z. The radar then listens for the reflections from the various scatterers, time being shown in the direction of the arrow. The first reflection received back in point of time is from scatterer L, as shown, which is nearest in point of distance from the airplane 1. However, scatterer L is on half hyperbola B' so that its frequency has been changed by the Doppler shift phenomenon from $f_0$ to $f_0+\Delta_2 f_0$. The next reflections received back in turn in point of time are respectively the reflection of scatterer K at a frequency $f_0+\Delta_1 f_0$ (since it lies on half hyperbola B), the reflection of scatterer Q at a frequency of $f_0+\Delta_3 f_0$ (since it lies on half hyperbola B''), the reflection of scatterer M at a frequency of $f_0+\Delta_2 f_0$ (since it lies on half hyperbola B'), and the reflection of scatterer R at a frequency of $f_0+\Delta_3 f_0$ (since it lies on half hyperbola B'').

In other words, the various reflections coming back from the several scatterers on the terrain, and as a result of a single pulse, are separated by time as shown and are further characterized by possessing a plurality of different frequencies (three only being shown for purposes of simplification) due to the different Doppler effects.

Figure 7:
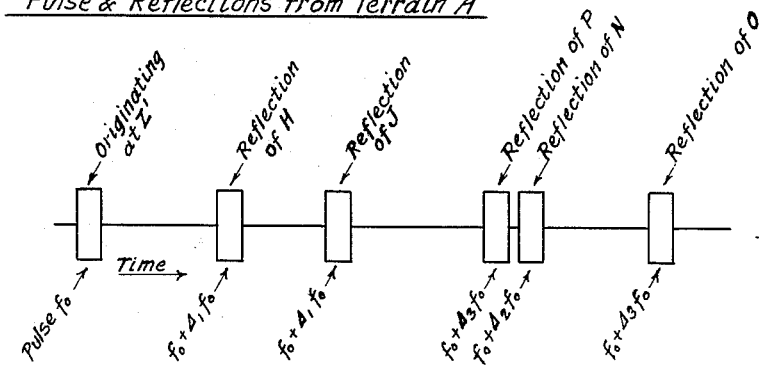
FIG. 7 is a view similar to FIG. 6 but showing the pulse and reflections from terrain A.

FIG. 7, like FIG. 6, but concerned with terrain A, shows the modulation envelope of a pulse at frequency $f_0$ originating at height $h$ on line Z'. The modulation envelopes of the reflections received back in turn in point of time are respectively the reflection of scatterer H at a frequency of $f_0+\Delta_1 f_0$ (because it lies on half hyperbola A), the reflection of scatterer J at a frequency of $f_0+\Delta_1 f_0$ (because it also lies on half hyperbola A), the reflection of scatterer P at a frequency of $f_0+\Delta_3 f_0$ (because it lies on half hyperbola A''), the reflection of scatterer N at a frequency of $f_0+\Delta_2 f_0$ (because it lies on half hyperbola A'), and the reflection of scatterer O at a frequency of $f_0+\Delta_3 f_0$ (because it lies on half hyperbola A'').

Figure 8:
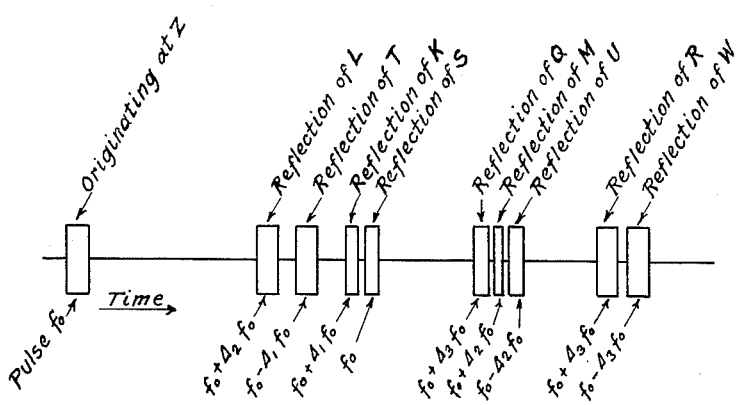
FIG. 8 is a view similar to FIGS. 6 and 7 but showing the radar pulse and reflections from FIG. 5.

FIG. 8, in a like manner, graphically shows the modulation envelope of the originating pulse and the modulation envelopes of the return signals from the various scatterers of FIG. 5, illumined to one side of the terrain but to both front and rear. With the originating pulse generated at frequency $f_0$ at height $h$ on line Z, the reflections received back in turn in point of time are respectively the reflection of scatterer L at a frequency of $f_0+\Delta_2 f_0$ (because L lies on half hyperbola B'), the reflection of scatterer T at a frequency of $f_0+\Delta_1 f_0$ (because T lies on half hyperbola —B), the reflection of scatterer K at a frequency of $f_0+\Delta_1 f_0$ (because K lies on half hyperbola B), the reflection of scatterer S at a frequency of $f_0$ (no frequency change because there is no Doppler effect on scatterer at right angles to the direction of flight of the airplane 1), the reflection of scatterer Q at a frequency of $f_0+\Delta_3 f_0$ (because Q lies on half hyperbola B''), the reflection of scatterer M at a frequency of $f_0+\Delta_2 f_0$ (because M lies on half hyperbola B'), the reflection of scatterer U at a frequency of $f_0-\Delta_2 f_0$ (because U lies on half hyperbola —B'), the reflection of scatterer U at a frequency of $f_0-\Delta_2 f_0$ (because U lies on half hyperbola —B'), the reflection of scatterer R at a frequency of $f_0+\Delta_3 f_0$ (because R lies on half hyperbola B'') and the reflection of scatterer W at a frequency of $f_0-\Delta_3 f_0$ (because W lies on half hyperbola —B'').

It will be understood that the frequency changes due to the Doppler effect are negative from the scatterers T, U and W lying to the rear of the airplane.

The apparatus and method of the present invention are shown in block diagram form in FIG. 9, wherein pulse generator apparatus 6 is provided for alternately illuminating terrain A and terrain B, or more usually, for illuminating terrain to only one side of the line of flight of the airplane 1. Receiver mechanism 7 picks up the time and frequency separated reflections from the various scatterers on the terrain, all as heretofore discussed in conjunction with FIGS. 6, 7 and 8. Mechanism 8 separates the reflections into frequency separated groups, and mechanism 9 separates by time the various reflections in each group. With respect to mechanism 9 this is diagrammatic only of a modulator action because it will be recognized that the return signals are inherently separated in time, and that the important point is that this inherent separation must not be lost. Arrows 10 indicate that here may be an overlapping or simultaneous functioning of the mechanisms 8 and 9.

Mechanism 11 provides for the visual reproduction of each reflection in each group, and, in general, this mechanism usually will include a cathode ray tube in which the sweep circuits are arranged to paint a series of half hyperbolas (FIGS. 4 or 5) on the tube so as to substantially duplicate thereon the number and shape of the half hyperbolas formed (theoretically) on the terrain. Each half hyperbola thus represents on the cathode ray tube a line-like area or sector of the terrain in which all scatterers thereon cause reflections having the same frequency change due to the Doppler effect.

Therefore, and having reference to FIG. 5, when half hyperbola B'' is traced on the CR tube all reflections having a frequency of $f_0+\Delta_3 f_0$ are used (giving azimuth), and properly separated in time serve to modulate the electron beam of the CR tube so that scatterers Q and R are painted in time-separated manner (giving range) on the CR tube trace of the half hyperbola B''. In a like manner, as the other half hyperbolas B', B⁰, —B' and —B'' are traced in turn on the CR tube, the frequency-separated reflections of the scatterers on the several half hyperbolas are used in typical time-separated manner to modulate the electron beam of the CR tube and paint the respective scatterers in properly time-separated manner (range) on the proper frequency-separated (azimuth) half hyperbolas.

It will be recognized that the hyperbolas AB, A'B', and A''B'' or half hyperbolas B, B' and B'' painted or generated by the sweep circuits on the cathode ray tube (and duplicating the number and shape of the hyperbolas or half hyperbolas formed (theoretically) on the terrain) are characteristic of one altitude $h$ of the aircraft, and the hyperbolas or half hyperbolas will be of slightly different shape as the altitude $h$ is changed. However, it has been found that by working with the substantially straight line (substantially radial) portions only of the hyperbolas or half hyperbolas, the system of the invention functions satisfactorily over a relatively wide range of altitudes without necessity to change the sweep circuits controlling the hyperbolas or portions of hyperbolas painted or generated on the cathode ray tube.

For a more particular understanding of the invention, reference should be had to FIG. 10 in which the block diagram has been broken down by dotted line boxes into, typically, a coherent radar section 12, a Doppler frequency filter 13, and an indicator 14. The coherent radar section 12 is substantially conventional and includes a lower power transmitter stage 15 and a receiver 16. The transmitter stage 15 includes typically a master oscillator 17 (operated, for example, at a frequency of 970 mc.), mixer 18, power amplifier 19, and R.F. gate modulator 20 which passes about a four micro second pulse. The receiver 16 typically includes R.F. amplifier 21, mixer 22, and I.F. amplifier 23. Completing the coherent radar 12 is the final power amplifier 24, associated pulse modulator 25 (passing about a two micro second pulse), duplexer 26, crystal oscillator 27 (operated, for example, at a frequency of 30 mc.), and antenna 27a. Coherence is obtained by (1) using a part of the master oscillator output as the local oscillator signal to mixer 22, and (2) using another part of the master oscillator output mixed in mixer 18 with the output of crystal oscillator 27 (operating at the I.F. frequency) as the transmitter signal.

The Doppler frequency filter 13 includes a ground speed response control 28 comprising a synchronous demodulator 29, a filter 30, and a PRF generator 31 for controlling the pulse repetition frequency (PRF) so that the Doppler spectrum around any harmonic of the PRF be just wide enough to meet but not to overlap the spectrum around adjacent harmonics, whereby the entire spectrum is filled with unambiguous target, i.e., reflector return information. The ground speed response control 28, more generally defined as the automatic PRF control will be described in greater detail hereinafter.

The Doppler frequency filter 13 also includes a synchronous demodulator 32, important linear phase shift mechanism, called a Doppler compensator 33, hereinafter described in greater detail, important video signal weighting mechanism 34 hereafter described in greater detail, storage tube 35, and controlling sweep circuits 36 for the storage tube.

The indicator box 14 includes display means, such as a cathode ray tube display 37 and associated sweep circuits 38.

The various blocks of FIG. 10 are electrically connected in the manner illustrated and inasmuch as this is clear no numbers have been applied to the actual electric leads. It may be noted, however, that the operating frequency $f_o$ has been shown beside the electric lead extending from the mixer 18 to the power amplifier 19. The heterodyning frequency $f_r$ extends from the oscillator 17 to the mixer 22, and reference or intermediate frequency $f_1$ from oscillator 27 to mixer 18 and compensator 33. Also, a frequency $f_1 \pm df$ has been shown between the compensator 33 and the synchronous demodulator 32. And a frequency $f_1 \pm \Delta f_o$ has been shown between the receiver 16 and the synchronous demodulator 32. Because of the heterodyning technic, the frequency $f_o \pm \Delta f_o$ heretofore described as returned to the Doppler frequency filter 13 becomes $f_1 \pm \Delta f_o$.

Returning now to the ground speed response control 28, i.e., automatic PRF control, it will be recognized that the ground speed of the antenna may be constantly varying, and if the PRF is too high or too low the CRT display is distorted. These difficulties may be avoided by controlling the PRF with the true ground speed. Or it is also possible to avoid the indicated difficulties by leaving the PRF alone and varying the transmitter frequency in response to ground speed. However, it is more convenient to vary the PRF and this is the manner usually employed and is the one which will be described.

The integrated output of an accelerometer is one measure of true ground speed but such a device is subject to drift and would lead to errors if it were used alone to control the PRF. Or this accelerometer system can be used in combination with the system to be described in the next several paragraphs.

Figure 11:
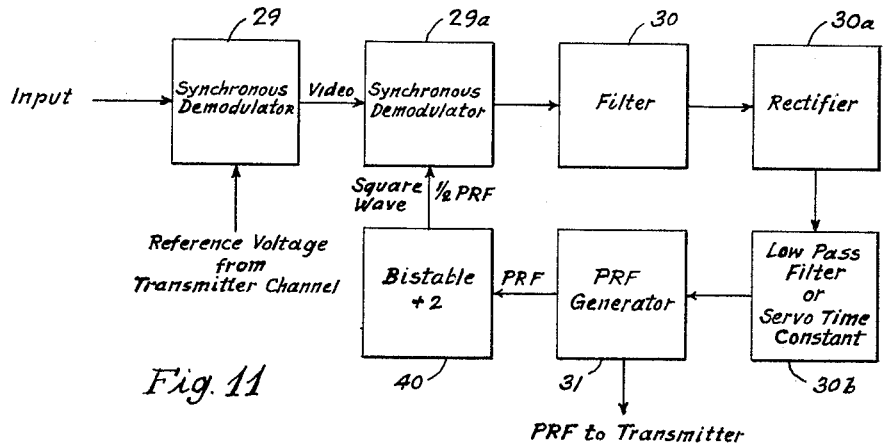
FIG. 11 is a schematic block diagram of the detail of the Ground Speed Response control of FIG. 10.

A preferred method is to measure the target, i.e., reflection return power at frequencies midway between the PRF harmonics (mid-harmonic position) and utilize the result to set the PRF. FIG. 11 shows a system employing synchronous demodulators 29 and 29a, the first demodulator 29 having an I.F. input from I.F. amplifier 23, and a reference voltage input $f_r$ from the crystal oscillator 27. The frequency components of the video signal passing to the second synchronous-demodulator 29a are all reduced by one-half the PRF by the bistable circuitry 40 operated by the PRF from the PRF generator 31 which can be mechanically driven. The filter 30 following the demodulator 29a may be a comb filter employing Tchebycheff weighting, or it may be a conventional low pass filter. Using a conventional low pass filter 30, only energy from the returning signal at the frequency $f_c \pm \frac{1}{2}F$ is passed on to the rectifier 30a with $f_c$ being carrier frequency and F being the width of the Doppler spectrum.

Thus, no signal reaches the rectifier 30a if the PRF is higher than that required so that the Doppler spectrum around any harmonic of the PRF is just wide enough to meet but not to overlap the spectrum around adjacent harmonics. Stated mathematically this takes the form of the equation $$F_D = \frac{2f_cV}{C} = \frac{1}{2} PRF$$

and wherein $F_D$ is width of Doppler spectrum, $f_c$ is carrier frequency, V is radar velocity, and C is constant. Now assuming that the passband of the filter 30b is square and is of a width $a$ ($a$ being, for example, 1% of the PRF or less), the response of the system as a function of the PRF appears as in FIG. 12. In this figure, the dotted line is the value of the PRF which satisfies the above equation. The two discontinuities in the slope of the curve occur at $PRF = 2F_D + 2a$. The voltage output of the filter 30b is used to set the PRF, and the circuit is adjusted to keep the output of the filter on the sloping portion of the curve so that the difference between the actual PRF and the PRF of the above equation is equal to or less than $2a$.

Thus, and stated broadly, the ground speed response control 28, i.e. the automatic PRF control loop, employs as a measure of ground speed the Doppler shift of a returned maximum Doppler shift signal to increase or decrease the PRF to substantially fill the return spectrum but to not overlap it.

The Doppler compensator 33, i.e., the phase shifter, is diagrammatically shown in FIG. 13. In general, it is the purpose of this mechanism to in effect achieve scanning in azimuth of the illuminated terrain by changing the passbands of the filter section 13 (FIG. 10) to allow the various Doppler changed frequencies of the reflections of the numerous scatterers on the terrain to pass in turn. Thus, and by way of example, the reflections from half hyperbola B″ at a frequency of $f_r + \Delta_3 f_o$ would be passed. Then, the reflections from the half hyperbola B′ at a frequency of $f_r + \Delta_2 f_o$ would be passed, etc.

The total range of frequency variation used in scanning is always equal to the width of the Doppler spectrum. This Doppler spectrum width is always made equal to the PRF by the operation of the ground speed control. To prevent image distortion the scanning reference frequency must be a given fixed percentage of the maximum positive or negative Doppler shift when the indicator sweep is at a given fixed angle. The actual frequency deviation of the reference in cycles per second, for a given azimuthal angle, of course varies with ground speed. The above condition is met by using the output of the ground speed response control to vary the maximum excursion of the reference frequency so that it remains equal to the maximum Doppler shift. In the sonic Doppler compensator this is done by dividing down the PRF to a frequency range suitable for motor operation. The output of the divider is then amplified and used to run a synchronous motor which drives the crystal or reflector in the sonic compensator.

More specifically, a form of single side band modulation (frequency shift or phase shift) is performed on the transmitter carrier frequency $f_o$ (as originally described), or some coherently related frequency $f_1$ (as last described), such as the intermediate frequency, and this is passed to the synchronous demodulator 32 to progressively shift the passband characteristic thereof. It might be noted here that the establishing of progressively changing passbands can be achieved with respect to the video signals as well as in the R.F. signals, although the latter technic will be described.

The single side band modulation or phase shifting can be accomplished in several ways. For example, by means of a reactance tube, or a phase shift condenser, or by varying the magnetic field in a Phasitron tube, or by employing two crystal oscillators running at the intermediate frequency and then tuning the two crystals with a differential capacitor to effect the relative frequency shift of the two oscillators.

FIG. 13 in conjunction with FIG. 10 shows still another, and a preferred manner, of effecting phase shifting. As before stated, the intermediate frequency $f_1$ is fed to the phase shifter or compensator 33 through the apparatus shown in FIG. 13. This includes a pair of crystals 41 and 42 submerged in a liquid, such as water, in a tank 43. The $f_1$ is fed to crystal 41 and crystal 42 mounted on a shaft 44 is reciprocated toward and from crystal 41 by any suitable mechanism. That shown effects substantially linear movement of the crystal 42 by mounting a shoe 45 pivotally at the end of the rod 44 and receiving this shoe slidably in a cam track 46 (of proper shape to give linear motion) cut in a disk 47 carried on a shaft 48 driven by a synchronous motor 49. Driving the rod 44 with a Scotch yoke, for example, gives sinusoidal motion to the crystal 42 and this has been found to be satisfactory as well.

The movement of the crystals 41 and 42 toward and from each other creates in the supersonic tank Doppler effect changes in the frequency output of $f_1 \pm df$ and in amounts substantially equal to the ranges encountered in the $f_1 \pm \Delta f_o$ frequency changes of the scatterer reflections. In other words, with a typical $f_1$ of 30,000,000 cycles per second the apparatus of FIG. 13 serves to progressively increase this frequency to about 30,000,500 cycles per second (as the crystals 41 and 42 move towards each other) and then progressively decreases the frequency to about 29,999,500 cycles per second (as the crystals 41 and 42 move away from each other), the cycle from −500 to +500 cycles taking, in one embodiment, about four seconds or slightly less (this being the time to paint the CR tube once). The Doppler compensator drive is driven by a motor whose input frequency is a fixed fraction of the PRF, so that the speed of the sonic crystal at each point in its cycle is proportional to the radar speed.

It might be mentioned here that with the apparatus described the CR tube is painted from left to right, then from right to left. It is preferable to paint the CR tube from left to right and to then snap back to again paint from left to right. If this is desired than the apparatus of FIG. 13 must be changed to provide always for a $df$ increase, as by a one way cam and a snap back spring, or, more simply and preferably by switching means.

In theory the $df$ change effected by the apparatus of FIG. 13 should be in saw tooth steps and with the same $df$ being maintained for a selected number of radar pulses and scatterer returns before the next $df$ or passband is established. This selected number of pulses $n$ may be chosen between reasonable limits, as controlled by time requirements, fullness of information, storage tube limitations, etc., as will be understood, but in the embodiment of the invention illustrated and described the number of pulses $n$ and listening periods of each value of $df$ has been selected as 64.

In actual practice it has been found that it is not necessary to change the $df$ by saw tooth steps or jumps, but it is satisfactory to slowly but continuously increase or decrease the $df$ with the apparatus of FIG. 13, or the modifications thereof described, but with the 64 pulses and listening periods being provided for each gradual change in $df$ in an amount equivalent to one saw tooth jump.

In the system of the invention any desired number N of $df$ changes or passbands can be established, again as controlled by time requirements, fullness of information, etc., but in the form of the invention described the number N of $df$ changes or passbands established to obtain an adequate sweep in azimuth is 60. In map matching technics or other guidance systems, rather than providing for a full 180° azimuth sweep of all of terrain B of FIG. 5, it is the preferred and usual practice to sweep in azimuth only through about 90° this being distributed about 45° ahead and about 45° behind a line perpendicular to the line of flight V of the aircraft.

It is the function of the synchronous demodulator 32 to compare the frequency of the $f_1 \pm \Delta f_o$ returns of the various scatterers on the terrain illuminated with the gradually changing frequency $f_1 \pm df$ of the phase shifter or compensator 33. If the return signal of a given scatterer at a frequency $f_1 \pm \Delta f_o$ is equal to or substantially equal to the reference frequency $f_1 \pm df$ of the phase shifter 33 then a steady voltage is generated by the demodulator 32 for deposit on the storage tube 35, as hereinafter described. If, however, the return signal from a given scatterer at a frequency $f_1 \pm \Delta f_o$ is not equal to or substantially equal to the reference frequency $f_1 \pm df$ of the phase shifter 33, then a voltage varying in amplitude is produced by the demodulator 32, and this voltage when summed on the storage tube 35, as hereafter described, will cancel out.

In this manner, the phase shifter 33, synchronous demodulator 32, and storage tube 35 act as an effective Doppler frequency filter. More specifically, a series of, for example, sixty passbands are thus effectively provided in turn, each passing return signals from scatterers having the same or substantially the same Doppler shift. A sweep in azimuth of the terrain is accordingly provided in effect, it being understood that the azimuth sweep instead of being radial is in the form of the progressively changing half hyperbola heretofore described.

The video signals leaving the synchronous demodulator 32 are weighted by mechanism 34 (FIGS. 10 and 14) to emphasize the echo or return signal of a scatterer having an azimuth corresponding to the passband. Having reference to FIG. 14, the mechanism 34 is a video gain control in which the gain is changed each pulse repetition period in accordance with the Tchebycheff coefficients for $n=64$ and $p=30$ db. The video gain control is, in the embodiment shown, a high speed 64 position rotary switch having contacts 51 and rotary contact arm 52 on shaft 53. Shaft 53 may be driven by synchronous motor means 54 or may be tied in with motor means for controlling the PRF if such are employed. A cathode ray type sixty-four position electrostatic switch may be used instead of the mechanical switch described here.

Associated with each contact 51 of the rotary switch is a resistor 55, the value of these resistors progressively increasing half way around the switch and then progressively decreasing over the remaining half of the rotation. The contact arm 52 makes one complete rotation every 64 pulses and the result is that the video signal output to the storage tube 35 emphasizes the echo signal of the reflecting scatterer having an azimuth corresponding to the passband of the filter, this emphasis being achieved by increasing the rejection ratio of the stop bands of the filter.

The weighted video signals from mechanism 34 are passed to the storage tube 35 which functions as part of a comb filter to pass those frequencies in the coherently demodulated radar return which are multiples of the PRF and to reject those frequencies between the PRF harmonics. In the present embodiment of the invention, which is a line-at-a-time build-up system, the filtering is accomplished by storing the scatterer return signals for 64 separate radar pulses (over a selected range of typically 25 to 50 miles), and summing the return signals in such a manner that returns at the same range and of the passband frequency add together. If not of the proper passband frequency the scatterer return signals when summed algebraically in the storage tube substantially cancel out.

The signals as read out of the storage tube are used to intensity modulate the CRT display 37, and represent in terms of range the time-separated scatterers or targets along a particular half hyperbola of constant Doppler shift.

More specifically, and having reference to FIGS. 15 and 16, the 64 sets of scatterer returns from the 64 pulses generated during each passband or $df$ setting of the Doppler compensator 33 are stored in parallel lines on the storage area of an electrostatic storage tube (such as an RCA Radechon 405). The lines are spaced to occupy a square area. FIG. 15 represents the storage area with 64 sets of returns stored in parallel vertical lines, the returns being inherently time-separated in range in a vertical direction as indicated along the vertical side of the square.

Reading out the information, stored as described, is done by a reading beam, having a diameter approximately equal to the spacing between lines. The reading beam is swept across the stored lines first at the 25 mile range and the 64 bits of charge are algebraically summed and are presented to the CRT display 37 at the 25 mile range. As heretofore described, if any of the first set of return signals stored on the storage tube 35 at 25 mile range are of a Doppler shift $\Delta f$ corresponding to the passband $df$ established by the Doppler compensator 33 then the stored return signals when added algebraically as a result of the horizontal sweep of the reading beam cause a positive voltage which will modulate the electron beam of the CRT display at the 25 mile range to show the presence of the scatterer thereon. If, on the other hand, none of the first set of return signals stored on the storage tube 35 at the 25 mile range are of a Doppler shift $\Delta f$ corresponding to the passband $df$ established by the Doppler compensator 33 then the stored return signal charges when added algebraically as a function of the horizontal sweep of the reading beam will substantially cancel out and no modulation of the electron beam of the CRT display at the 25 mile range will be effected.

Inasmuch as the act of reading out the stored information erases the stored charge, the space cleared by reading out the information at the 25 mile range is now available to store new information. Therefore, the beam is again swept across the same horizontal line and the radar return from the 65th pluse from 25 to 50 miles is stored horizontally across the bottom of the storage area.

Now the beam is stepped vertically one beam width, and is swept horizontally to read out the second increment in range. The beam is then swept horizontally the second time to record the 66th radar return.

This process continues until the first set of 64 returns are completely read out and the second set of 64 returns is stored in parallel horizontal lines as shown in FIG. 16.

The information stored in the horizontal lines of FIG. 16 is read out by vertical sweeps of the reading beam, in a manner analogous to that described for the previous case of vertically stored lines, and a third set of 64 returns is stored as a set of parallel vertical lines. This process continues sixty times, as previously described, with alternate sets of 64 returns stored horizontally and then vertically, the beam in each case sweeping orthogonally to the lines being read out and depositing new sets of line orthogonal to the old.

Thus, the establishment by the Doppler compensator 33 of sixty $df$ changes provides sixty passbands, and with a set of 64 returns being stored and later read out for each passband. As heretofore generally described, each passband corresponds to a half hyperbola (line B'', B', B, B⁰, —B, —B' and —B'') representative of all scatterers having the same Doppler shift. A series of sixty half hyperbolas are generated in turn on the CRT display 37 during one complete sweep or cycle thereof, each half hyperbola corresponding to a passband. The scatterer returns are, accordingly, effectively separated in azimuth as will be understood. The separation of the scatterer returns in time, i.e. range, is not lost and modulation of the CRT electron beam painting each half hyperbola is obtained as aforesaid to paint in, in terms of range, a scatterer properly present on the half hyperbola.

Thus, the returns of the various scatterers illuminated isotropically and differing from each other in Doppler shift and time but all mixed together, are separated in azimuth and in range and are painted in proper position on the RCT display 37.

Sweep circuits 36 and 38, triggered by the PRF generator 31 are within the skill of the man versed in the art and will not be described in detail.

Mention has been made above to a strip mapping modification of the invention wherein a narrow fan beam linear array may be used to illuminate the terrain at, usually, right angles to the directon of flight of the airplane. Only a very narrow spread in Doppler shift is effected, but the radar carrier frequency can be raised so that the Doppler spectrum of the illluminated region occupies the same frequency band as when all the terrain is illuminated. The result is a radar system with resolutions approaching those obtained with optical systems but with reasonable antenna apertures. In conventional systems such resolutions could not be obtained with apertures which aircraft could carry.

While a certain representative embodiment and details have been shown for the purpose of illustrating the invention, it will be apparent to those skilled in this art that various changes and modifications may be made therein without departing from the spirit or scope of the invention.

What is claimed is:

1. The combination of a Doppler type airborne radar of means for sending out a series of pulses to at least a portion of one side of the line of flight of the aircraft, heterodyning means for converting the reflections of the pulses to a frequency of $f_1 \pm \Delta f_o$, wherein $f_1$ is the transmitted frequency and $\Delta f_o$ is the change in frequency of the reflection due to the Doppler effect, means for supplying a changing reference frequency of $f_1 \pm df$, the reference frequency effectively changing after $n$ pulses to the next of a plurality N of values, the total change in $df$ in all N values being substantially equal to the total change in $f$ caused by the Doppler shift, means for synchronously demodulating the reference frequency and the reflections, means for electrically weighting the demodulated reflections of $n$ pulses, means for electrically storing the weighted reflections of $n$ pulses, means for algebraically summing and reading out the stored reflections for $n$ pulses, the stored reflections substantially cancelling when $f_1 \pm \Delta f_o$ does not substantially equal $f_1 \pm df$, a cathode ray tube for visually reproducing the read-out reflections, means whereby the electron beam of the cathode ray tube is changed to a new sweep in azimuth after $n$ pulses and has a number of sweeps in azimuth corresponding to N, means whereby the read-out reflections of $n$ pulses are used to modulate in range the electron beam of the cathode ray tube during one sweep in azimuth, and means for coordinating the speed of the aircraft with the pulse frequency.

2. The combination in a Doppler type airborne radar of means for sending out a series of pulses to at least a portion of one side of the line of flight of the aircraft, heterodyning means for converting the reflections of the pulses to a frequency of $f_1 \pm \Delta f_o$, wherein $f_1$ is the transmitted frequency and $\Delta f_o$ is the change in frequency of the reflection due to the Doppler effect, means for supplying a changing reference frequency of $f_1 \pm df$, the reference frequency effectively changing after $n$ pulses to the next of a plurality N of values, the total change in $df$ in all N values being substantially equal to the total change in $f$ caused by the Doppler shift, means for synchronously demodulating the reference frequency and the reflections, means for electrically storing the reflections of $n$ pulses, means for algebraically summing and reading out the stored reflections for $n$ pulses, the stored reflections substantially cancelling when $f_1 \pm \Delta f_o$ does not substantially equal $f_1 \pm df$, a cathode ray tube for visually reproducing the read-out reflections, means whereby the electron beam of the cathode ray tube is changed to a new sweep in azimuth after $n$ pulses and has a number of sweeps in azimuth corresponding to N, means whereby the read-out reflections of $n$ pulses are used to modulate in range the electron beam of the cathode ray tube during one sweep in azimuth, and means for coordinating the speed of the aircraft with the pulse frequency.

3. The combination in a Doppler type airborne radar of means for sending out a series of pulses to at least a portion of one side of the line of flight of the aircraft, heterodyning means for converting the reflections of the pulses to a frequency of $f_1 \pm \Delta f_0$, wherein $f_1$ is the transmitted frequency and $\Delta f_0$ is the change in frequency of the reflection due to the Doppler effect, means for supplying a changing reference frequency of $f_1 \pm df$, the reference frequency effectively changing after $n$ pulses to the next of a plurality N of values, the total change in $df$ in all N values being substantially equal to the total change in $f$ caused by the Doppler shift, means for synchronously demodulating the reference frequency and the reflections, means for electrically storing the reflections of $n$ pulses, means for algebraically summing and reading out the stored reflections for $n$ pulses, the stored reflections substantially cancelling when $f_1 \pm \Delta f_0$ does not substantially equal $f_1 \pm df$, a cathode ray tube for visually reproducing the read-out reflections, means whereby the electron beam of the cathode ray tube is changed to a new sweep in azimuth after $n$ pulses and has a number of sweeps in azimuth corresponding to N, and means whereby the read-out reflections of $n$ pulses are used to modulate in range the electron beam of the cathode ray tube during one sweep in azimuth.

4. The combination in a Doppler type airborne radar of means for sending out a series of pulses to at least a portion of one side of the line of flight of the aircraft, heterodyning means for converting the reflections of the pulses to a frequency of $f_1 \pm \Delta f_0$, wherein $f_1$ is the transmitted frequency and $\Delta f_0$ is the change in frequency of the reflection due to the Doppler effect, means for supplying a changing reference frequency of $f_1 \pm df$, the reference frequency effectively changing after $n$ pulses to the next of a plurality of N values, the total change in $df$ in all N values being substantially equal to the total change in $f$ caused by the Doppler shift, means for synchronously demodulating the reference frequency and the reflections, means for electrically storing the reflections of $n$ pulses, means for algebraically summing and reading out the stored reflections for $n$ pulses, the stored reflections substantially cancelling when $f_1 \pm \Delta f_0$ does not substantially equal $f_1 \pm df$, and cathode tube means for visually reproducing the read-out reflections.

5. The combination in a Doppler type airborne radar of means for sending out a series of pulses to at least a portion of one side of the line of flight of the aircraft, heterodyning means for converting the reflections of the pulses to an intermediate frequency plus or minus the changes in the original frequency due to the Doppler effect, means for supplying a changing reference frequency equal to the intermediate frequency plus or minus a frequency ranging between zero and the maximum change in the original frequency caused by the Doppler effect, means for synchronously demodulating the reference frequency and the reflections, means for storing the reflections of $n$ pulses during which time the reference frequency does not effectively change, means for algebraically summing and reading out the stored reflections for $n$ pulses, means for visually reproducing the read-out reflections, and means for changing the reference frequency to a new value for a second series of $n$ pulses, the means for visually reproducing the read-out reflections inherently separating the reflections in range, and the means for visually reproducing the read-out reflections changing to a new position in azimuth after each series of $n$ pulses.

6. The combination in a Doppler type airborne radar of means for sending out a series of pulses, means for separating the reflections into groups differing from each other by frequency changes caused by the Doppler effect, means for displaying the several groups separated in azimuth, and means for coordinating the speed of the aircraft with the pulse frequency.

7. The combination in a Doppler type airborne radar of means for sending out a series of pulses, means for separating the reflections of the pulses in to groups differing from each other due to frequency changes caused by the Doppler effect, means for electrically storing the reflections, means for reading out the stored reflections, and means for visually reproducing the read-out reflections, the reflections being electrically stored in a storage tube as a plurality of parallel lines, with read-out of the stored information being made substantially at right angles to the storage of the information, and with the means functioning to alternately store a line of information and then read-out comparable range sections of all previously stored lines.

8. The combination in a Doppler type airborne radar of means for sending out a series of pulses, means for supplying a changing reference frequency, and means for synchronously demodulating the reference frequency in conjunction with the reflections of the pulses, the means for supplying a changing reference frequency including a pair of piezo-electric crystals positioned in a liquid, and means for moving the crystals to and from each other to effect, ultra-sonically, changes in frequency in the reference frequency corresponding to the changes in frequency of the reflections due to the Doppler effect.

9. Apparatus for scanning terrain from a moving object, such as an airplane, and including means for sending out isotropically a series of time-separated pulses from the object, means for receiving between pulses the reflections of a pulse from the terrain, means for separating the reflections from a pulse into groups differing from each other by frequency changes due to the Doppler effect, means for time-separating the reflections in each group, and means for visually reproducing the time-separated reflections in each group.

10. Apparatus for scanning terrain from a moving object, such as an airplane, and including means for sending out isotropically a series of time-separated pulses from the object to alternately illuminate a right-hand portion and a left-hand portion of the terrain, means for receiving between pulses the reflections of a pulse from the terrain, means for separating the reflections from a pulse into groups differing from each other by frequency changes due to the Doppler effect, means for time-separating the reflections in each group, and means for visually reproducing the time-separated reflections in each group.

11. Apparatus for scanning terrain from a moving object, such as an airplane, and including means for sending out a series of time-separated pulses from the object to illuminate a portion of the terrain to one side of the line of movement of the object, means for receiving between pulses the reflections of a pulse from the terrain, means for separating the reflections from a pulse into groups differing from each other by frequency changes due to the Doppler effect, means for time-separating the reflections in each group, and means for visually reproducing the time-separated reflections in each group.

12. Apparatus for scanning terrain from a moving object, such as an airplane, and including means for sending out a series of time-separated pulses from the object to illuminate a portion of the terrain to one side of the line of movement of the object, means for receiving between pulses the reflections of a pulse from the terrain, means for separating the reflections from a pulse into groups differing from each other by frequency changes due to the Doppler effect, means for time-separating the reflections in each group, means for visually reproducing the time-separated reflections in each group, and means for controlling the pulse repetition frequency as a function of the speed of relative movement between the object and the terrain causing the reflections.

13. Apparatus for producing a radar image between a source and a plurality of objects having movement relative to the source which includes means for transmitting a series of time-separated pulses from the source, means for receiving between pulses the reflections of each pulse from the objects, means for synchronously demodulating the reflections in association with a progressively changing reference frequency, means for weighting the demodulated reflections, means for electrically storing the demodulated reflections, means for algebraically adding the stored reflections, a cathode ray tube, means for modulating the electron beam of the cathode ray tube with the algebraically added reflections to paint the objects in range thereon, and means coordinating the sweep of the electron beam of the cathode ray tube to the progressively changing reference frequency to achieve positioning of the objects in azimuth.

14. Apparatus for obtaining a radar image of terrain from an aircraft which includes means for isotropically illuminating a portion of the terrain lying to one side of the line of flight of the aircraft with a series of pulses, receiving means for separating the reflections from the terrain into groups differing from each other due to frequency changes caused by the Doppler effect, a display tube, means sweeping the display tube with the various groups being properly spaced in azimuth thereon, and means for painting the display tube with the various reflections in each group being inherently time-separated as to range.

References Cited by the Examiner
UNITED STATES PATENTS

| | | | |
|---|---|---|---|
| 2,223,224 | 11/40 | Newhouse | 343—8 |
| 2,480,208 | 8/49 | Alvarez | 343—11 |
| 2,637,024 | 4/53 | Lyman | 343—10 |

CHESTER L. JUSTUS, *Primary Examiner.*

NORMAN H. EVANS, *Examiner.*